July 9, 1929.  R. M. KINNARD  1,720,129
TOILET SEAT
Filed Dec. 21, 1928

Inventor
R. M. Kinnard
By Harry Frease
Attorney

Patented July 9, 1929.

1,720,129

UNITED STATES PATENT OFFICE.

ROBERT M. KINNARD, OF SEBRING, OHIO, ASSIGNOR TO THE GIBBS MANUFACTURING COMPANY, OF CANTON, OHIO, A CORPORATION OF OHIO.

TOILET SEAT.

Application filed December 21, 1928. Serial No. 327,600.

The invention relates to auxiliary toilet seats for use in connection with an ordinary toilet seat to adapt the same for use by children of different ages.

The object of the improvement is to provide an adjustable, folding auxiliary seat which may be readily and easily adjusted to the desired size and placed in position upon an ordinary toilet seat, to accommodate a child; and which may be folded to compact size to permit the same to be easily transported.

A further object is to provide a belt or harness which may be connected to the improved auxiliary seat, to securely hold the child upon the same, without danger of the child falling therefrom, thus producing a maximum of safety in its use by children.

The above and other objects may be attained by forming the improved auxiliary seat of two separate seat portions, each pivotally connected at one end to one of a pair of hinged or pivoted arms for engagement with the front portion of the ordinary toilet bowl, another arm being carried by the other end of each seat member for engagement with the side portion of the ordinary bowl, near the rear thereof.

Figure 1:
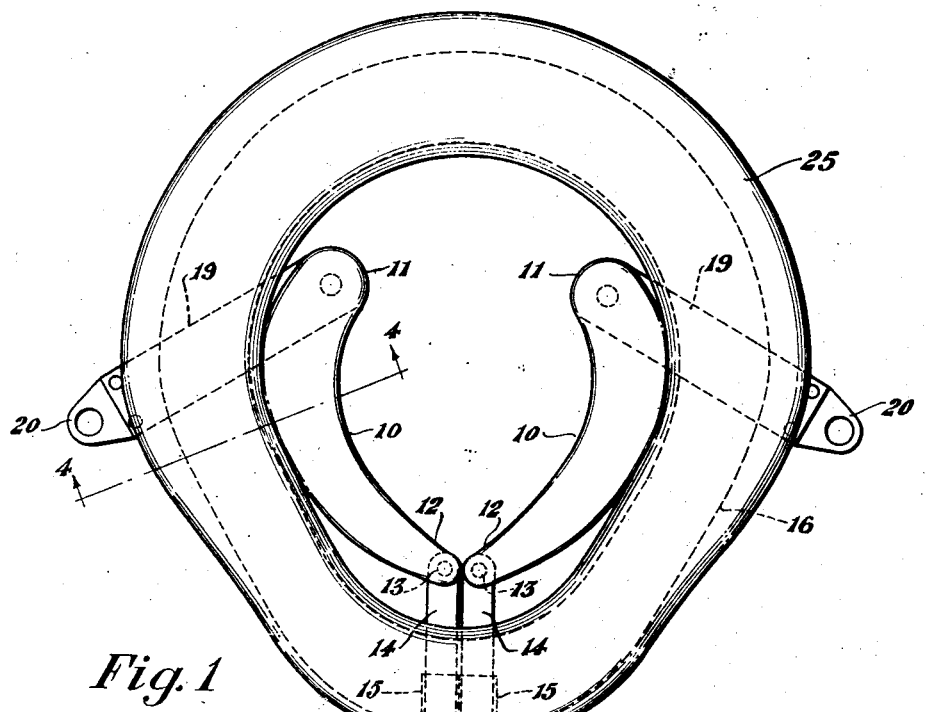
Figure 4:
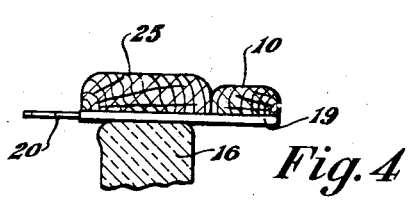
Figure 2:
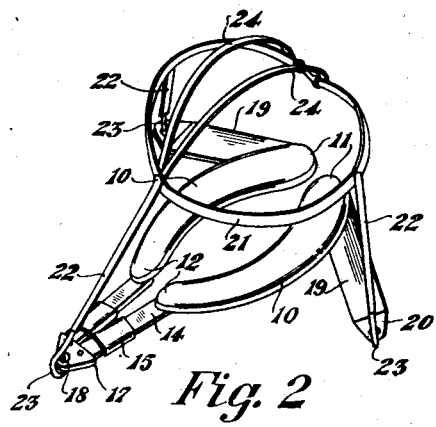
Figure 5:
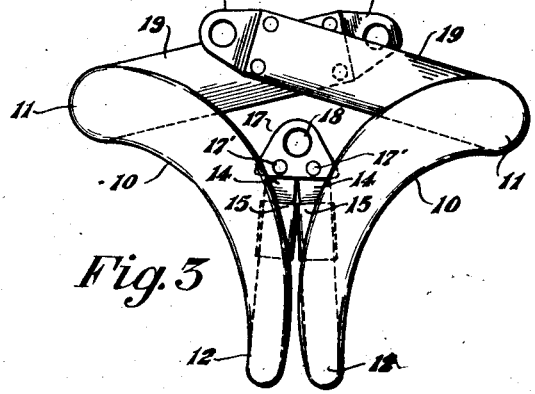

An embodiment of the invention is illustrated in the accompanying drawing, in which Figure 1 is a plan view of the improved auxiliary seat, showing the same in position for use in connection with an ordinary toilet bowl and seat;

Fig. 2, a perspective view of the auxiliary seat, showing the safety belt or harness connected thereto, in position for use;

Fig. 3, a plan view of the auxiliary seat shown in folded position for transporting the same; and Fig. 4, a sectional view taken as on the line 4—4, Fig. 1, showing one of the auxiliary seat bearing arms in position between the ordinary toilet seat and bowl.

Similar numerals refer to similar parts throughout the drawing.

The improved auxiliary seat, to which the invention pertains, includes a pair of similar seat members, each of which is shown at 10.

Each of these seat members is curved from end to end, as shown in the drawing, being preferably also slightly tapered from its rear end 11, toward its forward end 12, and the same may be slightly rounded in cross section, upon its upper surface, to provide a smooth, comfortable seat for the child.

The forward end 12 of each of the seat members, is pivotally connected, as shown at 13, to one of a pair of bearing arms or members 14, which are preferably formed of metal, or other suitable material, and provided with the cushions 15, of rubber or the like, to prevent marring of the bowl 16, upon which they are adapted to rest.

These bearing arms 14 are preferably pivoted or hinged at their outer or forward ends to a link 17, as shown at 17', and the link 17 is provided with the hole 18 for attaching the safety belt or harness which will be later described.

To the rear end of each of the seat members is connected a single bearing arm or member 19, which may be either rigidly or pivotally attached thereto, as desired, and arranged to rest upon the side portion of the bowl 16, near the rear thereof.

Each of the arms 19 may be provided, at its outer or free end, with an eye 20, for the attachment of the safety belt, or harness, hereinbefore referred to, which may comprise a belt portion 21, arranged to be strapped around the body of the child, beneath the arms, and the straps 22, provided with harness snaps or the like, as shown at 23, for connection through the hole 18 and eyes 20 of the several bearing arms above described.

Arm loops 24 may be carried by the belt 21 and arranged to be slipped over the shoulders of the child to retain the belt in proper position around the body and prevent the same from slipping downward.

When the seat is not in use it may be folded into the position shown in Fig. 3, making a very compact arrangement whereby the seat may be easily transported or packed, requiring a minimum of space.

As shown in Figs. 1 and 4, when the improved removable auxiliary toilet seat is placed in position upon and supported by the walls of the bowl 16, and the usual main toilet seat 25 is placed over the same, the folding seat is locked against opening or spreading movement because the seat members 10 extend upward from the plane of the lower surface of the main seat, and inward of the main seat opening. Moreover, since the toilet seat 25 is located above the bearing arms 14 and 19, and since the bearing arms 14 and 19 rest directly on the bowl 16, the auxiliary seat is clamped between the main seat and the bowl and is held against upsetting or displacement when in use. And finally, when the harness is connected to the bearing members it is located around and over the main seat, whereby a child secured in the harness and sitting on the main and auxiliary seats is prevented from falling off of the seats and from displacing the auxiliary seat from its normal adjusted position.

I claim:

1. An auxiliary toilet seat comprising a front bearing member, a pair of seat members each pivoted at one end to the bearing member, and a bearing arm carried by the other end of each seat member.

2. An auxiliary toilet seat, including a front bearing member comprising a pair of pivoted arms, a seat member pivoted at one end to each arm, and a bearing arm carried by the other end of each seat member.

3. An auxiliary toilet seat comprising a front bearing member, a pair of seat members each pivoted at one end to the bearing member, and a bearing arm pivotally carried by the other end of each seat member.

4. An auxiliary toilet seat, including a front bearing member comprising a pair of pivoted arms, a seat member pivoted at one end to each arm, and a bearing arm pivotally carried by the other end of each seat member.

5. In combination with a toilet bowl and main seat therefor having an opening, a removable auxiliary toilet seat including bearing members supported on the walls of the bowl, and a seat member carried by the bearing members, the main seat being located above the bearing members and clamping the same to the bowl, and the seat member extending inward of the main seat opening.

6. In combination with a toilet bowl and main seat therefor having an opening, a removable auxiliary toilet seat including bearing members supported on and extending outward beyond the walls of the bowl, and a seat member carried by the bearing members, the main seat being located above the bearing members and clamping the same to the bowl, the seat member extending inward of the main seat opening, and a harness connected to the bearing members and located around and over the main seat, whereby a child secured in the harness and sitting on the main and auxiliary seats is prevented from falling off of the seats and from displacing the auxiliary seat from its normal position.

7. In combination with a toilet bowl and main seat therefor having an opening, a removable auxiliary toilet seat including adjustable seat members and bearing members extending from the seat members, the bearing members being supported on the walls of the bowl, the main seat being located above the bearing members and clamping the same to the bowl, and the seat members extending inward of the main seat opening.

8. In combination with a toilet bowl and main seat therefor having an opening, a removable auxiliary toilet seat including adjustable seat members and bearing members extending from the seat members, the bearing members being supported on and extending outward beyond the walls of the bowl, the main seat being located above the bearing members and clamping the same to the bowl, the seat members extending inward of the main seat opening, and a harness connected to the bearing members and located around and over the main seat, whereby a child secured in the harness and sitting on the main and auxiliary seats is prevented from falling off of the seats and from displacing the auxiliary seat from its normal adjusted position.

9. In combination with a toilet bowl and main seat therefor having an opening, a removable auxiliary toilet seat including adjustable seat members and bearing members extending from the seat members, the seat members extending upward from the plane of the lower surface of the main seat and located within the opening of the main seat, whereby the seat members are locked by the main seat against spreading movement, and the bearing members resting on the bowl and clamped by the main seat against the bowl.

10. In combination with a toilet bowl and main seat therefor having an opening, a removable auxiliary toilet seat including adjustable seat members and bearing members extending from the seat members, the seat members extending upward from the plane of the lower surface of the main seat and located within the opening of the main seat, whereby the seat members are locked by the main seat against spreading movement, the bearing members resting on the bowl and clamped by the main seat against the bowl, and a harness connected to the bearing members and located around and over the main seat, whereby a child secured in the harness and sitting on the main and auxiliary seats is prevented from falling off of the seats and from displacing the auxiliary seat from its normal adjusted position.

In testimony that I claim the above, I have hereunto subscribed my name.

ROBERT M. KINNARD